United States Patent
Davis

(10) Patent No.: US 10,914,827 B2
(45) Date of Patent: Feb. 9, 2021

(54) ANGLE SENSING FOR ELECTRONIC DEVICE

(71) Applicant: Microsoft Technology Licensing, LLC, Redmond, WA (US)

(72) Inventor: Jeffrey Michael Davis, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 15/945,599

(22) Filed: Apr. 4, 2018

(65) Prior Publication Data

US 2019/0310357 A1 Oct. 10, 2019

(51) Int. Cl.
| | |
|---|---|
| *G01S 11/00* | (2006.01) |
| *G01S 11/14* | (2006.01) |
| *G01B 17/00* | (2006.01) |
| *G06F 1/16* | (2006.01) |

(52) U.S. Cl.
CPC .............. *G01S 11/14* (2013.01); *G01B 17/00* (2013.01); *G06F 1/1681* (2013.01)

(58) Field of Classification Search
USPC .......................................................... 367/127
See application file for complete search history.

(56) References Cited

U.S. PATENT DOCUMENTS

| | | | |
|---|---|---|---|
| 6,452,572 B1 | 9/2002 | Fan et al. | |
| 7,119,843 B2 | 10/2006 | Terasaki et al. | |
| 7,319,890 B2 | 1/2008 | Fan et al. | |
| 7,817,805 B1 * | 10/2010 | Griffin | G01S 3/807 367/103 |
| 8,221,324 B2 * | 7/2012 | Pedersen | A61B 5/6805 361/679.02 |
| 9,612,625 B2 | 4/2017 | Oliver et al. | |
| 9,912,415 B2 * | 3/2018 | Tsfaty | H04W 76/10 |
| 10,073,668 B2 * | 9/2018 | Chun | G06F 1/1616 |
| 2002/0058531 A1 * | 5/2002 | Terasaki | H04N 7/148 455/556.1 |
| 2003/0044025 A1 | 3/2003 | Ouyang et al. | |

(Continued)

FOREIGN PATENT DOCUMENTS

WO 2006117718 A1 11/2006

OTHER PUBLICATIONS

Badawy, et al., "A Simple Angle of Arrival Estimation Scheme". Qatar University, Electrical Engineering Dept. and Computer Engineering Dept. Sep. 19, 2014. p. 7.

*Primary Examiner* — James R Hulka
(74) *Attorney, Agent, or Firm* — Alleman Hall Creasman & Tuttle LLP

(57) ABSTRACT

An electronic device includes a first portion, a second portion, and a joint moveably coupling the first and second portions for angular adjustment between the first and second portions. A speaker is fixed on the first portion at a first known distance from the joint, and a microphone is fixed on the second portion at a second known distance from the joint. An angle sensing machine is configured to emit a known sound from the speaker, detect the known sound at the microphone, and measure a transmission time of the known sound from speaker to microphone. Based on the transmission time, a current angle of the first portion relative to the second portion is calculated.

20 Claims, 6 Drawing Sheets

(56) References Cited

U.S. PATENT DOCUMENTS

| | | | |
|---|---|---|---|
| 2005/0141702 A1* | 6/2005 | Fan | H04M 1/0214 |
| | | | 379/433.01 |
| 2013/0108066 A1* | 5/2013 | Hyun | G01S 3/8083 |
| | | | 381/59 |
| 2014/0198618 A1* | 7/2014 | Cary | G01B 17/00 |
| | | | 367/99 |
| 2015/0131539 A1* | 5/2015 | Tsfaty | H04W 8/005 |
| | | | 370/329 |
| 2016/0109914 A1 | 4/2016 | Blum | |
| 2016/0223640 A1* | 8/2016 | Vilermo | G01S 5/0284 |
| 2016/0259378 A1* | 9/2016 | Oliver | G06F 1/1677 |
| 2017/0075640 A1 | 3/2017 | Chun et al. | |

\* cited by examiner

| TRANSMISSION TIME | JOINT ANGLE |
|---|---|
| 0.0005 SECONDS 602A | 35 DEGREES 604A |
| 0.0006 SECONDS 602B | 42 DEGREES 604B |
| 0.0007 SECONDS 602C | 42 DEGREES 604C |

ANGLE SENSING FOR ELECTRONIC DEVICE

BACKGROUND

Many electronic devices include hinges or joints that allow various portions of the electronic device to move relative to one another. For example, a laptop computer typically includes a keyboard portion moveably coupled to a display portion via a hinge, such that the display portion may assume any of a number of different angles relative to the keyboard portion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An electronic device includes a first portion, a second portion, and a joint moveably coupling the first and second portions for angular adjustment between the first and second portions. A speaker is fixed on the first portion at a first known distance from the joint, and a microphone is fixed on the second portion at a second known distance from the joint. An angle sensing machine is configured to emit a known sound from the speaker, detect the known sound at the microphone, and measure a transmission time of the known sound from speaker to microphone. Based on the transmission time, a current angle of the first portion relative to the second portion is calculated.

BRIEF DESCRIPTION OF THE DRAWINGS

FIG. 6 schematically shows an example lookup table.

DETAILED DESCRIPTION

In electronic devices having different portions that are moveable relative to one another, it is often desirable for the device to change some aspect of its behavior based on the current angle between the device's moveable portions. For example, a laptop computer will often turn off its display or enter a sleep mode when the laptop is closed, meaning the angle between the display and keyboard portions is near zero. For the sake of clarity, the angle between two portions of an electronic device moveably coupled with a joint will be referred to herein as a "joint angle." In the above example, the joint angle of the laptop is near zero.

Many electronic devices use purpose-built joint sensors for determining their current joint angle. However, such sensors occupy valuable space within the physical shell of the device, and in many cases provide only limited information regarding the current joint angle—e.g., only indicating whether the joint angle is at or above zero. Accordingly, the present disclosure describes an electronic device including an angle sensing machine configured to utilize a speaker and microphone of the device to determine the current joint angle. For example, the microphone may record a known sound emitted by the speaker. Based on the transmission time of the known sound, the current joint angle can be determined.

Figure 1A:
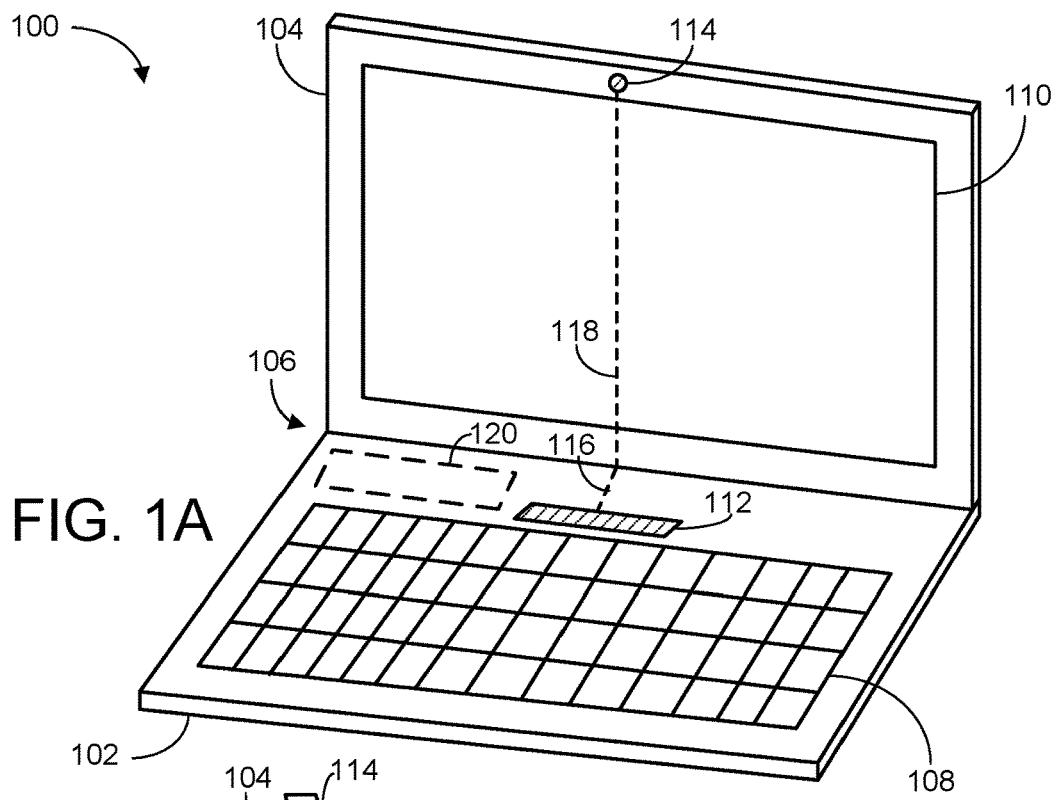
FIGS. 1A-1C schematically show an example electronic device including first and second portions moveably coupled via a joint.

FIG. 1A schematically shows an example electronic device 100 taking the form of a laptop computer. Electronic device 100 has a first portion 102, a second portion 104, and a joint 106 moveably coupling the first portion and the second portion for angular adjustment between the first and second portions. First portion 108 includes a keyboard, and thus may be referred to as a "keyboard portion." Similarly, second portion 104 includes a display 110, and may therefore be referred to as a "display portion."

Electronic device 100 is presented as a non-limiting example, and the angle sensing techniques described herein may be applied to any electronic device having at least two portions moveably coupled with a joint. Examples of alternate electronic devices are described below with respect to FIGS. 3A, 3B, 4A, and 4B. Furthermore, in some examples, the angle sensing techniques described herein may be performed by computing system 700 described below with respect to FIG. 7.

The word "joint" as used herein refers to any suitable mechanism or structure that links two portions of an electronic device, such that the two portions can move relative to one another. In some examples, the word "joint" may refer to a hinge. A hinge may include a single pivot, meaning each of the two portions of the electronic device rotate about a single pivot point, or the hinge may have a more complicated multi-pivot structure. In some examples, the joint coupling the two portions of the electronic device need not be a separate structure, but rather may be a portion of the electronic device that is flexible or bendable.

First portion 102 of electronic device 100 includes a speaker 112, while second portion 104 includes a microphone 114. Speaker 112 is fixed on first portion 102 at a first known distance 116 from joint 106. Similarly, microphone 114 is fixed on second portion 104 at a second known distance 118. As used herein, something having a "known distance" from a joint means that the electronic device has information regarding the physical distance of the component from a specific part of the joint. In other words, the electronic device has at least some information regarding its own structure. A "known" distance may be measured from the center of the joint (e.g., the joint pivot), and/or from any other suitable location, including the closest portion of the joint, a single common reference point (e.g., a point along the joint in the approximate center of the device), a particular edge of the joint, etc.

The known distance of a particular component of an electronic device from a joint may be determined at any suitable time and in any suitable way. For example, electronic device 100 may be provided with information regarding the known distances of speaker 112 and microphone 114 from joint 106 at the time of manufacture (e.g., in a configuration file or hardware driver). Electronic device 100 may be configured to learn the known distances of the speaker and microphone by performing a calibration routine, for example by performing the angle sensing techniques described herein when the joint angle is already known (e.g., when the device is closed). In some cases, an electronic device may be configured to allow a user to specify the known distances between the speaker, microphone, and joint. This may be useful in cases where the electronic device is customized, repaired, or built from scratch by a user.

Electronic device 100 also includes an angle sensing machine 120. Angle sensing machine 120 may take any suitable form and may in some examples be implemented as logic machine 702 described below with respect to FIG. 7.

Figure 2:
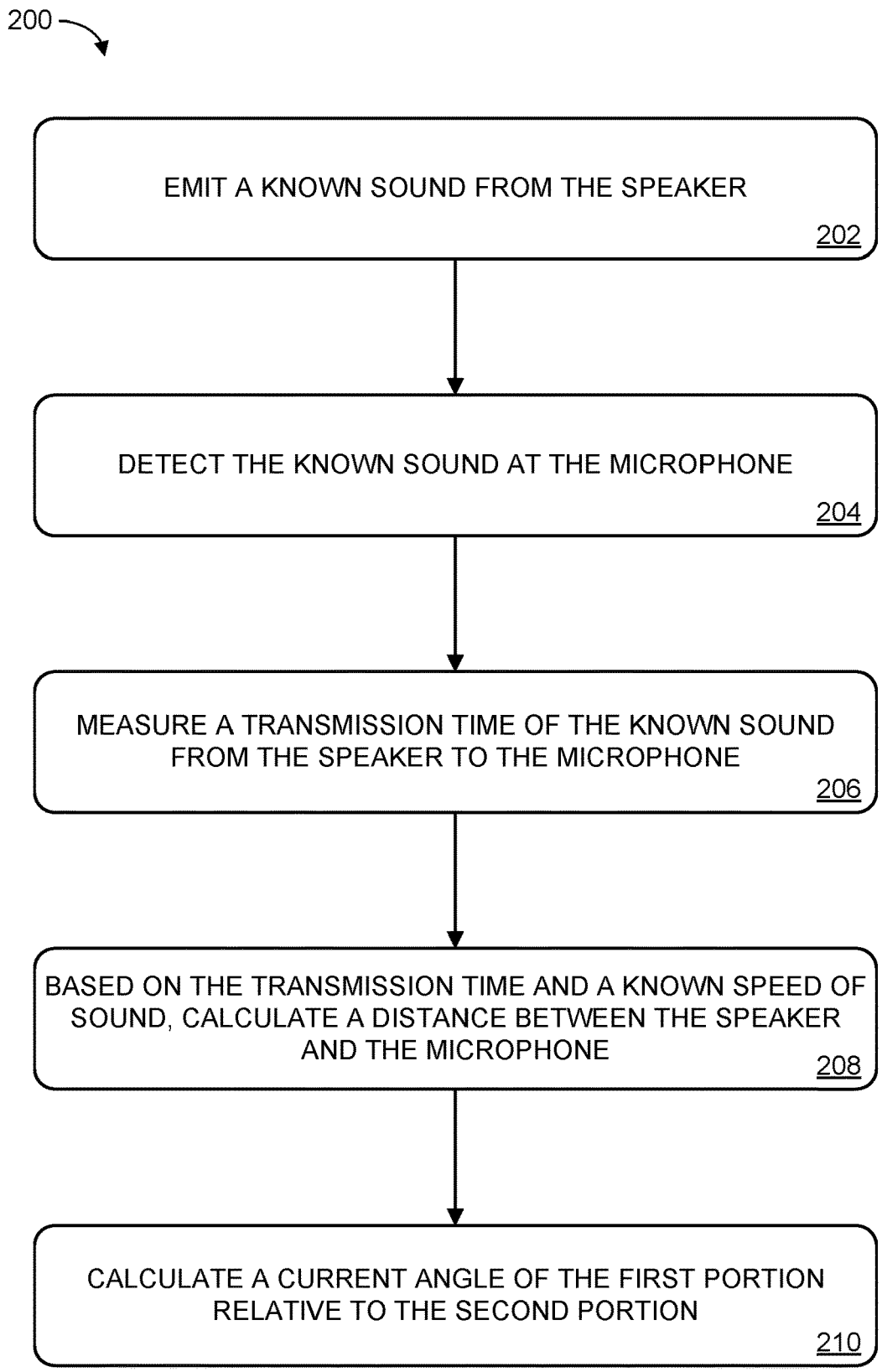
FIG. 2 illustrates an example method for angle sensing.

Angle sensing machine 120 is configured to perform a number of functions related to determining the current joint angle of electronic device 100. FIG. 2 illustrates an example method 200 including steps that may be carried out by angle sensing machine 120, and/or by other suitable computer hardware. For example, method 200 may be performed by computing system 700 described below with respect to FIG. 7.

At 202, method 200 includes emitting a known sound from the speaker. A "known sound" may take a variety of suitable forms. A known sound may include one or more frequencies and may optionally include ultrasonic frequencies that are inaudible to humans. In some examples, a known sound may be a pre-defined sound specified by the angle sensing machine. In other words, the known sound may take the form of a test tone or reference tone played any time angle sensing is performed. The angle sensing machine may in some cases be equipped with multiple different test tones or "known sounds," and select which test tone is appropriate depending on the scenario (e.g., whether the device is in active use, whether humans are present, the amount of background noise).

In other examples, the known sound may be sampled from user interface audio being played for other purposes (e.g., a sample of audio from a movie, television show, digital music track, video game). In other words, rather than playing a pre-defined test tone, the angle sensing machine may buffer or record a sample of live-playing audio and wait for the sample to be detected at the microphone. The angle sensing machine may in some cases augment user interface audio with one or more pre-defined frequencies, thereby making the known sound easier to detect.

Continuing with FIG. 2, at 204, method 200 includes detecting the known sound at the microphone. Detecting the known sound refers to monitoring frequencies/signal picked up by the microphone until corresponding frequencies/signal associated with the known sound are identified. For example, upon emitting the known sound from the speaker, the angle sensing machine may be configured to continuously compare frequencies/signal picked up by the microphone to frequencies/signal associated with the known sound until such time as the known sound has been detected. If the known sound has not been detected within a threshold time (e.g., corresponding to the maximum distance the geometry of the device will allow between speaker and microphone), the angle sensing machine may be configured to emit a new known sound from the speaker, optionally having higher volume to account for background noise contamination.

Figure 1B:
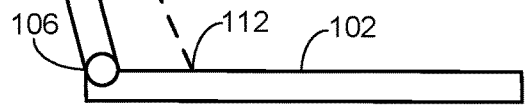

Emission and detection of the known sound is illustrated in FIG. 1B. FIG. 1B schematically shows a side profile of electronic device 100. In FIG. 1B, a known sound 122 is emitted from speaker 112 and is detected by microphone 114.

Returning to FIG. 2, at 206, method 200 includes measuring a transmission time of the known sound from the speaker to the microphone. The transmission time may be measured or calculated in any suitable way. For example, using a common clock, the angle sensing machine may record a time frame at which the known sound is emitted, and a second time frame at which the known sound is detected at the microphone. The difference between the two time frames corresponds to the transmission time of the known sound.

In some cases, the audio processing software and/or circuitry associated with the speaker and/or microphone may introduce latency into the emission and detection of the known sound, and this can affect the accurate calculation of the transmission time. In other words, there may be a difference between the time at which the angle sensing machine instructs the speaker to emit the known sound and the time at which the known sound is actually emitted. Similarly, there may be a difference between the time at which the known sound reaches the microphone and the time at which the known sound is detected by the angle sensing machine. This latency may be accounted for via calibration of the electronic device (e.g., testing at different known distances).

Additionally, or alternatively, measuring the transmission time may include calculating a cross-correlation of the known sound and a detected instance of the known sound captured by the microphone. Cross-correlation is used to determine the offset between two signals that are either identical or highly similar. In this case, a reference version of the known sound (i.e., the version that was emitted by the speaker) is compared to a detected instance of the known sound (i.e., the instance actually detected at the microphone, which may have contamination from background noise). The reference version of the known sound may be convolved (e.g., via linear convolution or fast Fourier transform convolution) with a time-reversal of the detected instance of the reference sound, giving the convolution, and therefore the offset (i.e., transmission time), between the reference and recorded versions of the known sound. When cross-correlation is used to find the transmission time, then the offset between the reference and recorded instance of the known sound may be reported as some number of samples. In this case, the transmission time may be calculated by dividing the number of offset samples by the signal sampling rate. For example, if the offset is determined to be 57 samples, and the sampling rate is 96 kHz, then the transmission time may be calculated to be 0.0006 seconds. This time may be adjusted to account for delays determined during calibration.

Continuing with FIG. 2, at 208, method 200 includes calculating a distance between the speaker and the microphone based on the transmission time of the known sound and a known speed of sound. This may involve simply multiplying the transmission time by the speed of sound. For example, when the transmission time is 0.0006 seconds and the speed of sound is 340 m/s, then the distance between the speaker and microphone is 0.2 meters.

At 210, method 200 includes calculating a current angle of the first portion relative to the second portion based at least on the distance between the speaker and the microphone, the distance between the speaker and the joint (i.e., the first known distance), and the distance between the microphone and the joint (i.e., the second known distance). In other words, the first and second known distances form two sides of a triangle, while the distance between the speaker and microphone forms the third side of the triangle.

Basic geometry can therefore be used to find the angle between the first and second portions of the electronic device.

This is illustrated in FIG. 1B, which schematically shows electronic device 100 from the side. As shown, a distance 124 between speaker 112 and microphone 114 has been calculated. Distance 124 forms one side of a triangle also comprised of first known distance 116 and second known distance 118. The geometry of this triangle is used to calculate a current angle 126 between first portion 102 and second portion 104 of electronic device 100. For example, according to the law of cosines:

$$\cos(C) = \frac{a^2 + b^2 - c^2}{2ab}$$

where C corresponds to the angle of a triangle, and a, b, and c correspond to the lengths of the sides of the triangle, such that angle C is positioned across from side c, between sides a and b.

In some cases, calculating the current distance between the speaker and the microphone (i.e., step 208 of method 200), as well as calculating the current angle of the first portion relative to the second portion (i.e., step 210 of method 200) may include consulting a look up table—for example, a table that correlates a plurality of different transmission times and/or microphone-to-speaker distances with a plurality of possible joint angles. This will be described in more detail below with respect to FIG. 6.

Electronic device 100 only includes a single microphone. However, in other examples, the angle sensing techniques may be applied to electronic devices having two or more microphones, as well as electronic devices having form factors other than laptop computers.

Figure 3A:
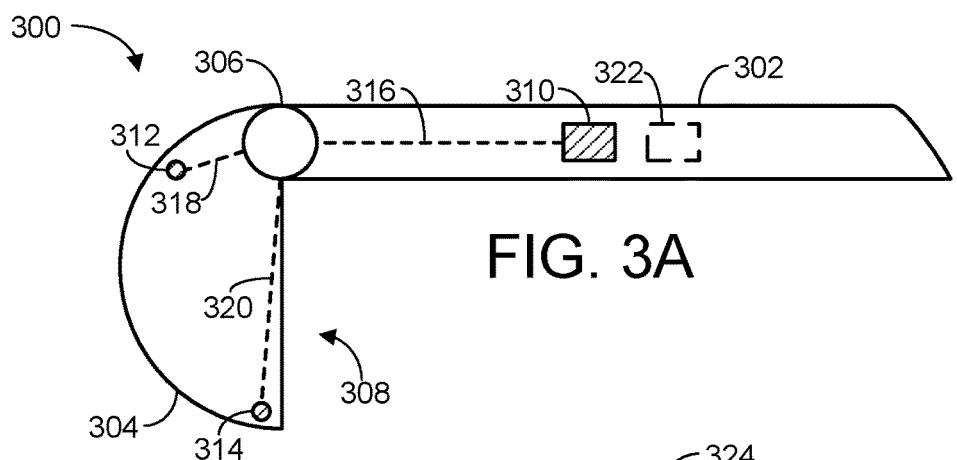
FIGS. 3A and 3B schematically show another example electronic device.
Figure 3B:
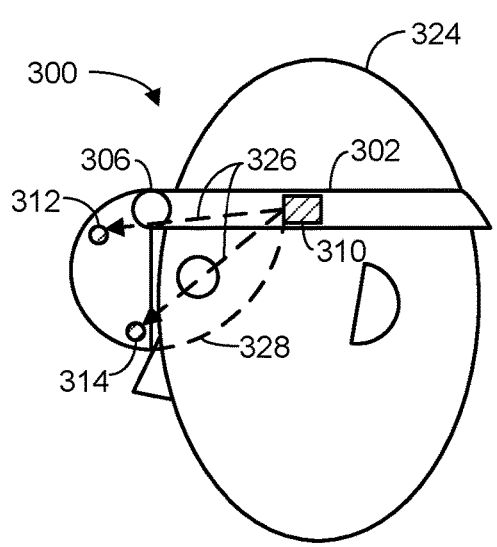

FIGS. 3A and 3B schematically show another example electronic device 300, this time taking the form of a head-mounted display device (HMD). Electronic device 300 is presented as a non-limiting example and may have any suitable structure and hardware arrangement. Electronic device 300 includes a first portion 302 and a second portion 304. A joint 306 moveably couples the first portion and the second portion for angular adjustment between the first and second portions. In this example, first portion 302 is sized and shaped to be worn on a human head (e.g., includes a headband worn by human 324 of FIG. 3B), while second portion 304 includes a near-eye display 308 configured to present imagery to a user eye. Thus, joint 306 allows rotation of the near-eye display into or out of the user's view. Near-eye display 308 may in some cases be used to present virtual or augmented reality images to a user of electronic device 300.

Electronic device 300 also includes a speaker 310 fixed on first portion 302 and two microphones 312 and 314 fixed on second portion 304. Speaker 310 is fixed at a first known distance 316 from joint 306, while microphone 312 is fixed at a second known distance 318 and microphone 314 is fixed at a third known distance 320.

As with electronic device 100, electronic device 300 includes an angle sensing machine 322 configured to perform steps aimed at determining the angle between first portion 302 and second portion 304. Angle sensing machine 322 may be implemented with any suitable computer hardware and may in some examples be implemented as logic machine 702 described below with respect to FIG. 7.

Figure 4A:
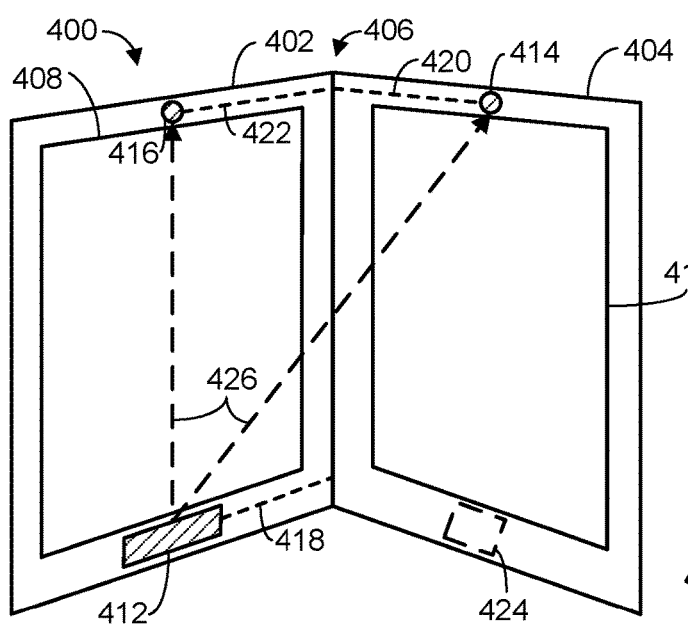
FIGS. 4A and 4B schematically show another example electronic device.
Figure 4B:
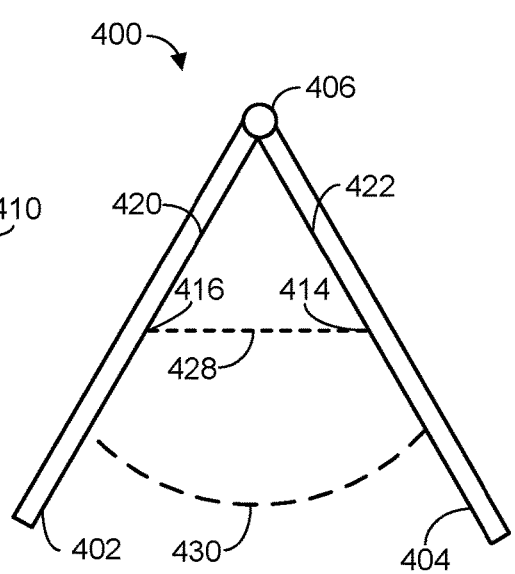

FIGS. 4A and 4B schematically illustrate another example electronic device 400, taking the form of a dual-display mobile device having a foldable form factor. Electronic device 400 includes a first portion 402 moveably coupled to a second portion 404 via a joint 406. In this example, first portion 402 includes a first display 408, while second portion 404 includes a second display 410. Displays 408 and 410 are each shown with large bezels—i.e., borders between the edge of the display and the edge of the electronic device. In other examples, these bezels may be reduced in size or eliminated entirely, such that the two displays appear to form one continuous display when electronic device 400 is unfolded. However, as with electronic devices 100 and 300, electronic device 400 is presented as a non-limiting example and may have any suitable structure and hardware arrangement.

Electronic device 400 includes a speaker 412 fixed on first portion 402 and a first microphone 414 fixed on second portion 402. Electronic device 400 also includes a second microphone 414 fixed on first portion 402. Speaker 412 is fixed at a first known distance 418 away from joint 406, while first microphone 414 is fixed at a second known distance 420 and second microphone 416 is fixed at a third known distance 422.

As with electronic devices 100 and 300, electronic device 400 includes an angle sensing machine 424 configured to perform steps aimed at determining the angle between first portion 402 and second portion 404. Angle sensing machine 424 may be implemented with any suitable computer hardware and may in some examples be implemented as logic machine 702 described below with respect to FIG. 7.

Figure 5:
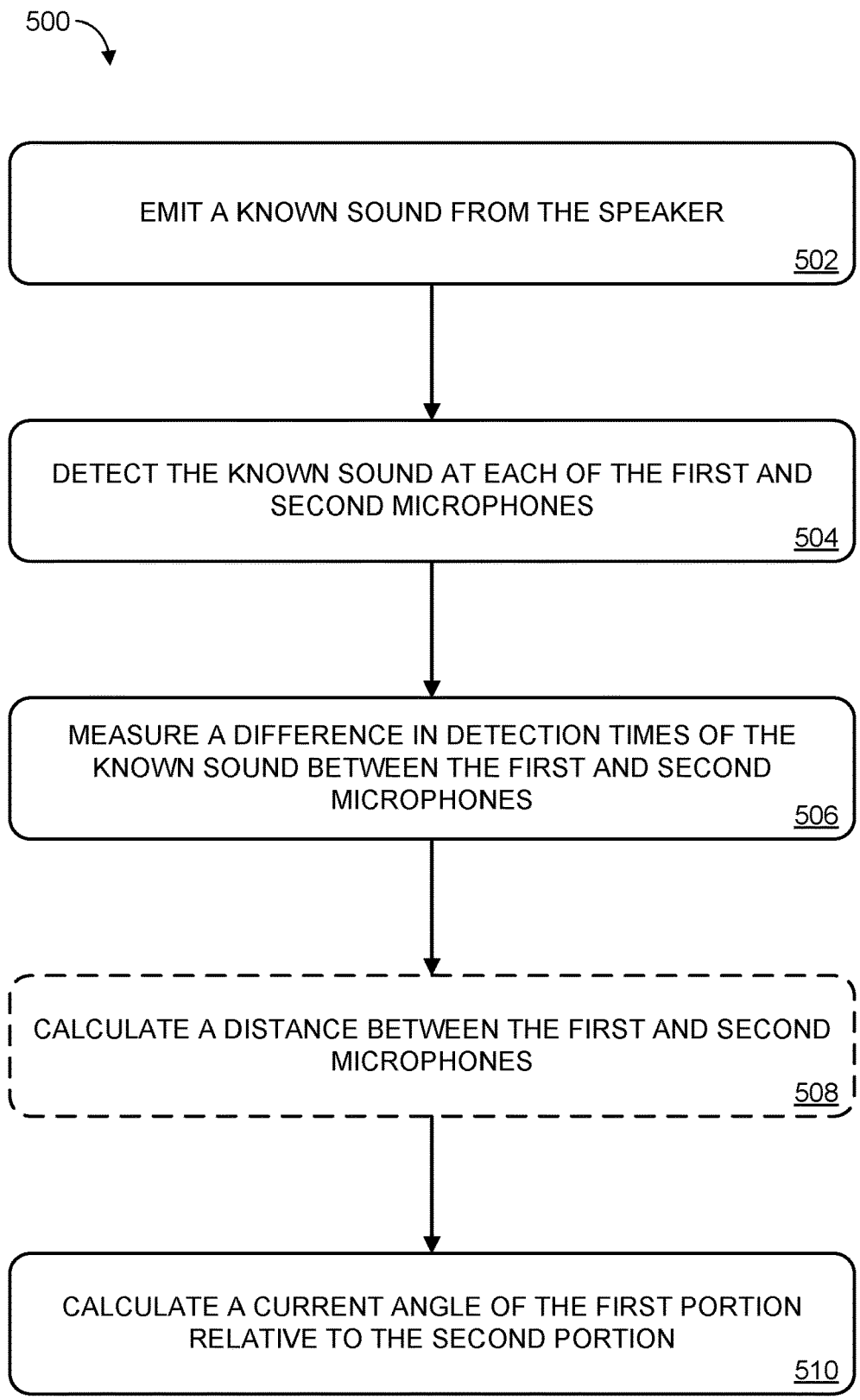
FIG. 5 illustrates another example method for angle sensing.

FIG. 5 illustrates another example method 500 for angle sensing that may be performed by electronic devices having two or more microphones. For example, steps of method 500 may be performed by angle sensing machines 322 and/or 424. Notably, regardless of the form factor of the electronic device, steps of method 500 may be performed in addition or as an alternative to steps of method 200 described above. In other words, method 500 may be implemented on devices having any suitable form factor, including on a laptop similar to electronic device 100 though having a second microphone on either the first or second portions. In some examples, method 500 may be implemented on computing system 700 described below with respect to FIG. 7.

At 502, method 500 includes emitting a known sound from the speaker, and at 504, method 500 includes detecting the known sound at each of the first and second microphones. This is illustrated in FIG. 3B as a known sound 326 is emitted from speaker 310 and detected by first microphone 312 and second microphone 314. Similarly, in FIG. 4A, speaker 412 of electronic device 400 emits a known sound 426 that is detected by first microphone 414 and second microphone 416.

At 506, method 500 includes measuring a difference in detection times of the known sound between the first and second microphones. Detection of the known sound at each microphone may be performed as described above with respect to FIG. 2. Once the known sound is detected at each microphone, the angle sensing machine records the times at which the known sound was detected at each microphone and calculates the difference. This difference in detection times gives information regarding the current physical position of the two microphones, and therefore information regarding the current joint angle of the electronic device. In other words, if each microphone detects the known sound at approximately the same time, then the joint angle must be such that the two microphones are approximately equidistant from the speaker. In some examples, the transmission time of the known sound between the speaker and each microphone may be measured as described above, and this may include calculating and correcting for any speaker and/or microphone latency.

At 508, method 500 optionally includes calculating the distance between the first and second microphones. This step may be performed by any electronic devices in which the two microphones are distributed between the two moveable portions of the electronic device, and therefore the physical distance between the two microphones can change while the device is in use. This is illustrated in FIG. 4B, which schematically shows electronic device 400 from above. A distance 428 has been calculated between the positions of the first microphone 414 and second microphone 416. Notably, this distance is dependent on the current joint angle of electronic device 400, such that folding the electronic device closed would reduce the distance between the two microphones to near-zero. The distance may be calculated geometrically and/or calculated using a lookup table.

Returning to FIG. 5, at 510, method 500 includes calculating a current angle of the first portion relative to the second portion. Depending on the specific hardware arrangement of the electronic device, this calculation may be performed at least based on the difference in detection times and/or current distance between the two microphones, as well as the known distances between each microphone and the joint (i.e., the second and third known distances). Again using the example of FIG. 4B, distance 428 between the first and second microphones forms one side of a triangle that also includes second known distance 420 and third known distance 422. Because the lengths of all three sides of the triangle are known, each angle of the triangle can also be calculated, giving angle 430 between the first and second portions of electronic device 400, for example using the law of cosines as discussed above. A lookup table may additionally or alternatively be used to perform this calculation.

In electronic device 300 of FIGS. 3A and 3B, each of the two microphones are on the second portion of the device. Thus, the two microphones maintain a fixed physical separation. Furthermore, the distance between each microphone and the joint is known (i.e., the second and third known distances). The two microphones can therefore be treated as a microphone array, with the difference in detection times of the known sound between the two microphones being useable to determine the angle of the speaker relative to the microphone array. This can be used to estimate the angle between the first and second portions of the electronic device, shown in FIG. 3B as angle 328. Once again, the distances between each microphone and the speaker form two sides of a triangle, and the difference in detection times of the known sounds can be used to determine the relative lengths of these sides. Meanwhile, the distance between the two microphones forms the third side of the triangle. Each angle of the triangle, including the angle of the speaker relative to the two microphones, may be geometrically calculated, for example using the law of cosines as discussed above. This angle is different from the joint angle of the device, though will have a fixed relationship to the joint angle, and this fixed relationship is a property of the specific structure of the device. Accordingly, when the structure of the device is known, then the joint angle can be calculated or inferred from the speaker angle.

Figure 1C:
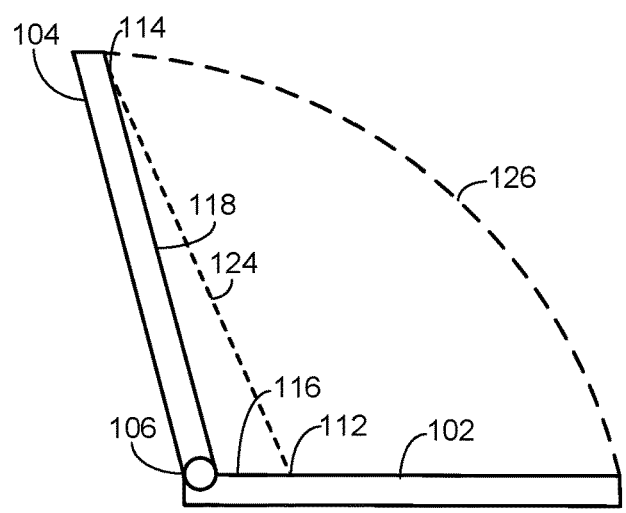

In each of the examples discussed above, calculating the joint angle of an electronic device optionally may include consulting a lookup table that correlates different transmission times (and/or differences in detection times) of the known sound with different angles between the first and second portions. Using the case of FIG. 1, calculating the current joint angle may include consulting a lookup table, such as example lookup table 600 schematically shown in FIG. 6. Lookup table 600 includes a plurality of different transmission times 602A-602C of the known sound and correlates the transmission times with a plurality of different joint angles 604A-604C of the electronic device.

The lookup table may correlate joint angles with any suitable variables or parameters. For example, lookup tables may correlate joint angle with transmission time of a known sound, a calculated speaker-to-microphone distance, a difference in detection times between two microphones, an angle of a speaker relative to a microphone array, etc. Lookup tables may be constructed during device design and/or calibration, and may be designed to account for a specific device's geometry and/or delays in signal transmission and/or detection.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
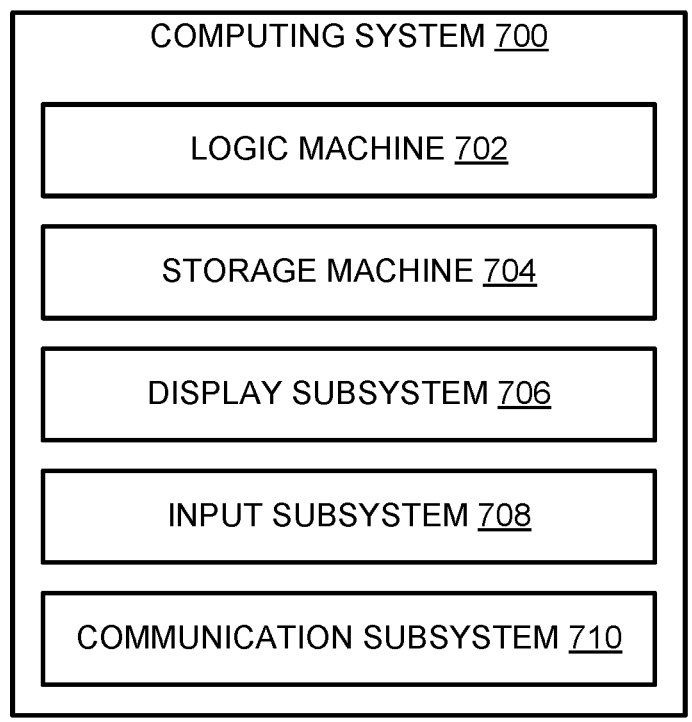
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more electronic devices, personal computers (e.g., laptop computers), server computers, tablet computers, home-entertainment computers, network computing devices, gaming devices, mobile computing devices, mobile communication devices (e.g., smart phone), wearable computing devices, virtual/augmented reality computing devices, and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In an example, an electronic device comprises: a first portion; a second portion; a joint moveably coupling the first portion and the second portion for angular adjustment between the first portion and the second portion; a speaker fixed on the first position at a first known distance from the joint; a microphone fixed on the second portion at a second known distance from the joint; and an angle sensing machine configured to: emit a known sound from the speaker; detect the known sound at the microphone; measure a transmission time of the known sound from the speaker to the microphone; based on the transmission time and a known speed of sound, calculate a distance between the speaker and the microphone; and calculate a current angle of the first portion relative to the second portion based at least on the distance between the speaker and the microphone and the first and second known distances. In this example or any other example, the electronic device further comprises a second microphone fixed on the second portion at a third known distance from the joint, and the angle sensing machine is further configured to determine a difference in detection times of the known sound between the microphone and the second microphone, and calculate the current angle of the first portion relative to the second portion based further on the difference in detection times and the second and third known distances. In this example or any other example, the electronic device further comprises a second microphone fixed on the first portion at a third known distance from the joint, and the angle sensing machine is further configured to determine a difference in detection times of the known sound between the microphone and the second microphone, calculate a current distance between the microphone and the second microphone based on the difference in detection times and the known speed of sound, and calculate the current angle of the first portion relative to the second portion based further on the current distance between the microphone and the second microphone and the second and third known distances. In this example or any other example, calculating the current angle of the first portion relative to the second portion includes consulting a lookup table that correlates different transmission times of the known sound with different angles between the first and second portions. In this example or any other example, the known sound includes ultrasonic frequencies. In this example or any other example, the known sound is a pre-defined sound specified by the angle sensing machine. In this example or any other example, the known sound is sampled from user interface audio playing for other purposes. In this example or any other example, the first portion includes a keyboard and the second portion includes a display. In this example or any other example, the first and second portions each include displays. In this example or any other example, the first portion is sized and shaped to be worn on a human head, and the second portion includes a near-eye display. In this example or any other example, measuring the transmission time of the known sound includes calculating a cross-correlation of the known sound and a detected instance of the known sound captured by the microphone.

In an example, an electronic device comprises: a first portion; a second portion; a joint moveably coupling the first portion and the second portion for angular adjustment between the first portion and the second portion; a speaker fixed on the first position at a first known distance from the joint; first and second microphones fixed at second and third known distances from the joint, at least one of the first and second microphones being fixed on the second portion; and an angle sensing machine configured to: emit a known sound from the speaker; detect the known sound at each of the first and second microphones; measure a difference in detection times of the known sound between the first and second microphones; and calculate a current angle of the first portion relative to the second portion based at least on the difference in detection times and the second and third known distances. In this example or any other example, the first and second microphones are each fixed on the second portion. In this example or any other example, the first microphone is fixed on the second portion and the second microphone is fixed on the first portion, and the angle sensing machine is further configured to calculate a distance between the first and second microphones based on the difference in detection times and a known speed of sound, and calculate the current angle of the first portion relative to the second portion based on the distance between the first and second microphones. In this example or any other example, the first and second portions each include displays. In this example or any other example, the first portion includes a keyboard and the second portion includes a display. In this example or any other example, the known sound includes ultrasonic frequencies. In this example or any other example, the known sound is a pre-defined sound specified by the angle sensing machine. In this example or any other example, the known sound is sampled from user interface audio being played for other reasons.

In an example, an electronic device comprises: a first portion; a second portion; a joint moveably coupling the first portion and the second portion for angular adjustment between the first portion and the second portion; a speaker fixed on the first position at a first known distance from the joint; a first microphone fixed on the second portion at a second known distance from the joint; a second microphone fixed on the first portion at a third known distance from the joint; and an angle sensing machine configured to: emit a known sound from the speaker; detect the known sound at each of the first and second microphones; measure a difference in detection times of the known sound between the first and second microphones; based on the difference in detection times and a known speed of sound, calculate a distance between the first and second microphones; and calculate a current angle of the first portion relative to the second portion based on the distance between the first and second microphones and the second and third known distances.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device, comprising:
   a first portion;
   a second portion;
   a joint moveably coupling the first portion and the second portion for angular adjustment between the first portion and the second portion;
   a speaker fixed on the first position at a first known distance from the joint;
   a microphone fixed on the second portion at a second known distance from the joint; and
   an angle sensing machine configured to:
      emit a known sound from the speaker;
      detect the known sound at the microphone;
      measure a transmission time of the known sound from the speaker to the microphone;
      based on the transmission time and a known speed of sound, calculate a distance between the speaker and the microphone; and
      calculate a current angle of the joint based at least on the distance between the speaker and the microphone and the first and second known distances.

2. The electronic device of claim 1, further comprising a second microphone fixed on the second portion at a third known distance from the joint, and where the angle sensing machine is further configured to determine a difference in detection times of the known sound between the microphone and the second microphone, and calculate the current angle of the joint based further on the difference in detection times and the second and third known distances.

3. The electronic device of claim 1, further comprising a second microphone fixed on the first portion at a third known distance from the joint, and where the angle sensing machine is further configured to determine a difference in detection times of the known sound between the microphone and the second microphone, calculate a current distance between the microphone and the second microphone based on the difference in detection times and the known speed of sound, and calculate the current angle of the joint based further on the current distance between the microphone and the second microphone and the second and third known distances.

4. The electronic device of claim 1, where calculating the current angle of the joint includes consulting a lookup table that correlates different transmission times of the known sound with different angles between the first and second portions.

5. The electronic device of claim 1, where the known sound includes ultrasonic frequencies.

6. The electronic device of claim 1, where the known sound is a pre-defined sound specified by the angle sensing machine.

7. The electronic device of claim 1, where the known sound is sampled from user interface audio playing for other purposes.

8. The electronic device of claim 1, where the first portion includes a keyboard and the second portion includes a display.

9. The electronic device of claim 1, where the first and second portions each include displays.

10. The electronic device of claim 1, where the first portion is sized and shaped to be worn on a human head, and the second portion includes a near-eye display.

11. The electronic device of claim 1, where measuring the transmission time of the known sound includes calculating a cross-correlation of the known sound and a detected instance of the known sound captured by the microphone.

12. An electronic device, comprising:
a first portion;
a second portion;
a joint moveably coupling the first portion and the second portion for angular adjustment between the first portion and the second portion;
a speaker fixed on the first position at a first known distance from the joint;
first and second microphones fixed at second and third known distances from the joint, at least one of the first and second microphones being fixed on the second portion; and
an angle sensing machine configured to:
emit a known sound from the speaker;
detect the known sound at each of the first and second microphones;
measure a difference in detection times of the known sound between the first and second microphones; and
calculate a current angle of the joint based at least on the difference in detection times and the second and third known distances.

13. The electronic device of claim 12, where the first and second microphones are each fixed on the second portion.

14. The electronic device of claim 12, where the first microphone is fixed on the second portion and the second microphone is fixed on the first portion, and the angle sensing machine is further configured to calculate a distance between the first and second microphones based on the difference in detection times and a known speed of sound, and calculate the current angle of the joint based on the distance between the first and second microphones.

15. The electronic device of claim 14, where the first and second portions each include displays.

16. The electronic device of claim 12, where the first portion includes a keyboard and the second portion includes a display.

17. The electronic device of claim 12, where the known sound includes ultrasonic frequencies.

18. The electronic device of claim 12, where the known sound is a pre-defined sound specified by the angle sensing machine.

19. The electronic device of claim 12, where the known sound is sampled from user interface audio being played for other reasons.

20. An electronic device, comprising:
a first portion;
a second portion;
a joint moveably coupling the first portion and the second portion for angular adjustment between the first portion and the second portion;
a speaker fixed on the first position at a first known distance from the joint;
a first microphone fixed on the second portion at a second known distance from the joint;
a second microphone fixed on the first portion at a third known distance from the joint; and
an angle sensing machine configured to:
emit a known sound from the speaker;
detect the known sound at each of the first and second microphones;
measure a difference in detection times of the known sound between the first and second microphones;
based on the difference in detection times and a known speed of sound, calculate a distance between the first and second microphones; and
calculate a current angle of the joint based on the distance between the first and second microphones and the second and third known distances.

* * * * *